United States Patent
Hartung

[11] 3,965,735
[45] June 29, 1976

[54] DEVICE FOR MEASURING PRESSURE BETWEEN CYLINDERS OF A PRINTING PRESS

[75] Inventor: Winfried Hartung, Offenbach am Main, Germany

[73] Assignee: Roland Offsetmaschinenfabrik Faber & Schleicher AG, Germany

[22] Filed: Apr. 10, 1975

[21] Appl. No.: 566,749

[30] Foreign Application Priority Data
Apr. 10, 1974  Germany............................ 2417522

[52] U.S. Cl................................ 73/141 A; 73/88 A
[51] Int. Cl.²............................................ G01L 5/00
[58] Field of Search............ 73/141 R, 88 A, 141 A; 356/152; 250/231 P

[56] References Cited
UNITED STATES PATENTS
| | | | |
|---|---|---|---|
| 2,166,153 | 7/1939 | Huck | 73/141 R |
| 3,232,164 | 2/1966 | Kern et al. | 356/152 |

FOREIGN PATENTS OR APPLICATIONS
| | | | |
|---|---|---|---|
| 661,219 | 6/1938 | Germany | 73/141 R |

Primary Examiner—Charles A. Ruehl
Attorney, Agent, or Firm—Wolfe, Hubbard, Leydig, Voit & Osann, Ltd.

[57] ABSTRACT

A device for measuring pressure between two cylinders of a press which includes a first mirror fixed to the end of a journal of one of the cylinders in a position perpendicular to the cylinder axis and a relatively stationary second mirror spaced substantially parallel to the first mirror. A light emitter at one edge of the mirrors, and lying in the common plane of the cylinders, directs a concentrated beam of light between the mirrors at a shallow angle of incidence for multiple reflection, with the point of exit of the beam at the other edge of the mirrors shifting in accordance with changes in the angular position of the first mirror as a result of slight bowing of the cylinder in response to changes in applied pressure. A photocell at the region of exit receives the beam to produce an output signal which varies in accordance with the shift in the point of exit of the beam to constitute a measure of the applied pressure. In one of the embodiments of the invention a relatively broad beam is used, with the output of the photocell varying in response to the degree of overlap of the beam with the photocell. In another embodiment of the invention a narrow beam is employed to produce an output signal which varies in accordance with the position of the beam within the field of the photocell. Preferably the light emitter, mirror, and photocell are secured to a common mount which is rockable about the cylinder axis for alignment of the optical path with the common plane of the cooperating cylinders.

14 Claims, 9 Drawing Figures

U.S. Patent June 29, 1976 3,965,735
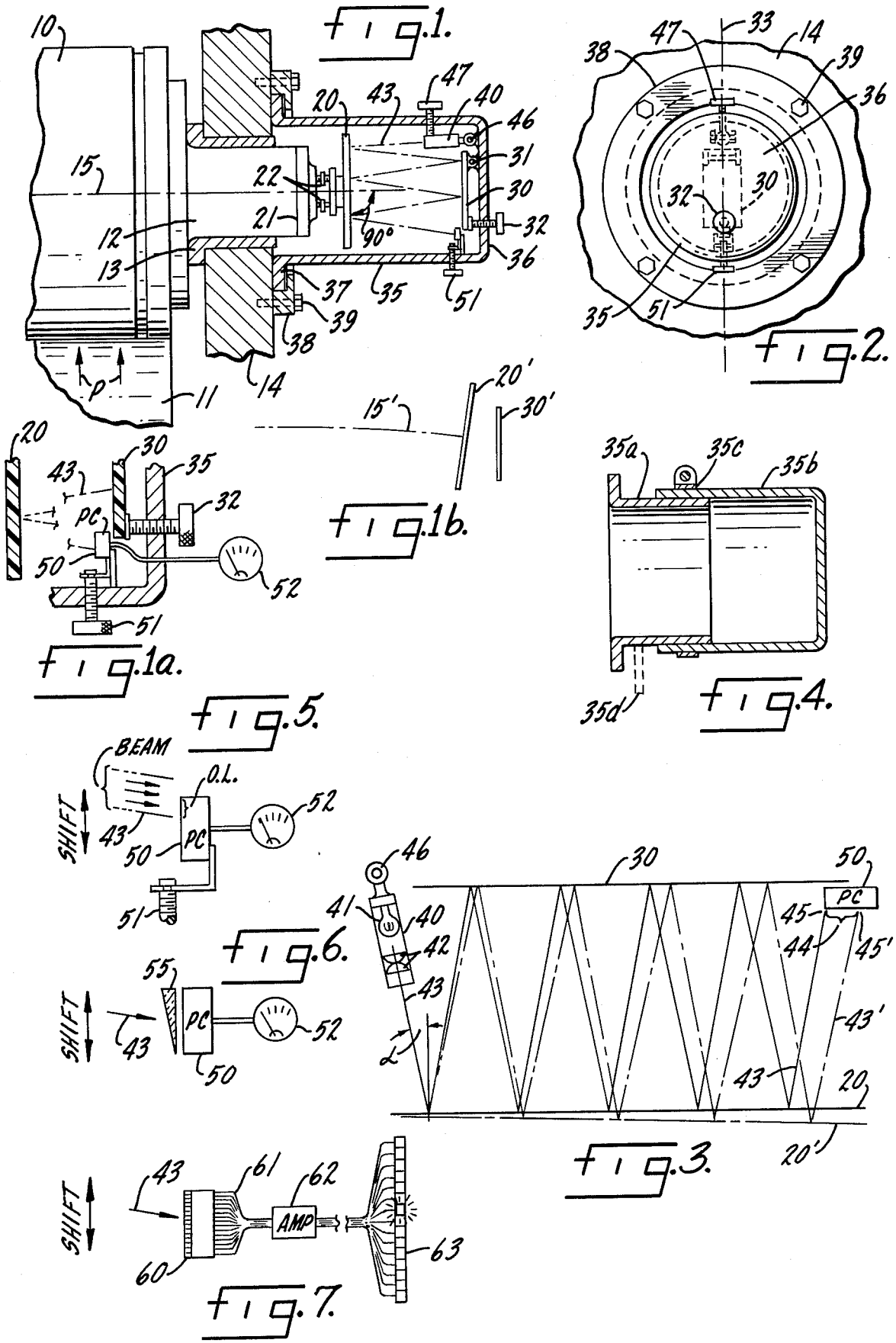

DEVICE FOR MEASURING PRESSURE BETWEEN CYLINDERS OF A PRINTING PRESS

Efforts have been made in the past to control, and maintain constant, the pressure exerted between two cooperating cylinders in a printing press in the face of changes in the characteristics of the paper, changes in the temperature, swelling of the blanket upon one of the cylinders, etc. Prior attempts at measurement have included use of pressure measuring cells or elongation measuring strips. The latter techniques are difficult and costly to employ and cannot be used in the continuous monitoring of pressure under actual running conditions.

It is, accordingly, an object of the present invention to provide means for measuring and monitoring the pressure between two cooperating cylinders which is simpler than the apparatus usually employed for this purpose, which is more sensitive and accurate and which is distinguished by a high degree of stability. It is a more specific object to provide means for measuring pressure between two rotating cylinders which provides response in accordance with cylinder deflection, which gives reliable results on the basis of small amounts of deflection, and in which the deflection is mechanically amplified employing optical means, thereby avoiding the problems associated with electrical amplification. Indeed, it is one of the features of the present invention that high amplification factors may be employed without sacrifice in accuracy or stability. Moreover, slip rings to bring out electrical connections are completely eliminated.

It is another object of the present invention to provide a pressure measuring means which is responsive only to applied pressure and which is not influenced by the amount of play in the bearings or by other extraneous factors.

It is yet another object of the present invention to provide a force measuring means which is simple, sturdy and compact, which is easily adjusted, and which may be easily utilized by regular press room personnel under practical press room conditions.

It is moreover an object of the present invention to provide means for measuring pressure between two cylinders which may be readily incorporated in existing designs of presses and which, indeed, may be added to presses already in the field, with minimum modification and at minimum expense.

Other objects and advantages of the invention will be apparent upon reading the attached detailed description and upon reference to the drawings in which:

FIG. 1 is a fragmentary end view of a printing cylinder having the improved pressure measuring means coupled to one journal thereof;

FIG. 1a is a fragmentary enlargement of a portion of the device shown in FIG. 1;

FIG. 1b diagrammatically illustrates the bowing of the cylinder under pressure;

FIG. 2 is a right-hand end view of the device shown in FIG. 1;

FIG. 3 is a diagram showing the shift of a multireflected beam of light occurring as a result of change in applied cylinder pressure;

FIG. 4 shows a modified housing construction;

FIG. 5 is a diagram showing shifting of a light beam to produce variable overlap with the field of the photocell;

FIG. 6 is a diagram showing shift of a narrow light beam with respect to an optical wedge-photocell combination;

FIG. 7 shows use of a narrow light beam with a series of miniaturized photoelectric elements.

While the invention has been described in connection with certain preferred embodiments, it will be understood that I do not intend to limit the invention to the embodiments shown but intend, on the contrary, to cover the various alternative and equivalent constructions included within the spirit and scope of the appended claims.

Turning now to the drawings there is shown a cylinder 10 of a printing press in rolling engagement with a cooperating cylinder 11 and with the cylinders being so adjusted with respect to one another that a total load, or pressure, P is exerted between them. The cylinder 10 has a journal 12 rotating in a bushing 13 which is mounted in one of the side walls 14 of the press frame. Under normal unstressed conditions rotation of the cylinder 10 occurs about a straight central axis of rotation 15.

In accordance with the present invention the pressure being exerted against the cylinder 10 is measured by rigidly securing to the end of the cylinder journal a mirror which is perpendicular to, and centered upon, the cylinder axis and by providing a relatively stationary second mirror spaced substantially parallel to the first, with a light emitter at one edge of the mirrors for directing a concentrated beam of light at a shallow angle of incidence for multiple reflection between the mirrors and with a photocell at the region of exit. The light emitter and photocell are adjusted in alinement with a plane which contains the two cylinders, and the photocell is so constructed and arranged as to produce an output signal which varies in accordance with the shift in the point of exit of the beam so that the photocell output signal constitutes a measure of the applied pressure.

Thus, referring to FIG. 1, a mirror 20 is used mounted on a pedestal or socket 21 which is secured to the end of the journal 12. "Leveling" screws, equally spaced and preferably three in number, indicated at 22, are interposed between the socket 21 and the mirror to enable the mirror to be adjusted to a condition of exact perpendicularity with respect to the cylinder axis 15 under zero pressure conditions. Arranged opposite the first mirror, and spaced substantially parallel to it at some distance, which may be on the order of a few inches, is a second mirror 30. The second mirror is mounted upon a hinge 31 and is adjustable about the hinge by means of an adjusting screw 32. In accordance with the invention the hinge axis is perpendicular to the common plane of the two cylinders 10 and 11, which common plane is indicated at 33 in FIG. 2.

Preferably the two mirrors are surrounded by a housing 35 to provide a light-tight compartment, with the mirror 30 being mounted, stationarily, inside of the end wall 36 of the housing. The housing is preferably of cup shape having a mounting flange 37 which is secured by a circular guiding and clamping member 38 held in place by screws 39. The guide 38 is arranged concentrically with respect to the cylinder axis 15, permitting the housing 35, and the elements which are secured to it, to be rocked about the cylinder axis into optimum position, with the housing being subsequently clamped firmly in place.

Secured at the edge of the mirrors in the common plane 33 of the cylinders, and preferably adjacent the second mirror 30, is a light emitter 40 which includes a lamp 41 (see FIG. 3) with suitable lenses 42 for producing a sharply defined beam of light 43 at a shallow angle of incidence $\alpha$. Because of the shallow angle of incidence and the substantially parallel orientation of the two mirrors, the beam 43 undergoes multiple reflection between the mirrors, exiting in a region of exit 44 at the opposite edge of the mirrors. With the first mirror 20 in its reference or "zero pressure" condition illustrated in FIG. 3, the beam 43 has a point of exit 45.

For the purpose of adjusting the angle of incidence $\alpha$, the emitter 40 is hinged to the housing at 46, with the hinge axis being perpendicular to the common plane of the cylinders 33. For adjusting the emitter to a desired orientation an adjusting screw 47 is used.

In carrying out the invention a light receiver in the form of a photocell 50 is arranged in the region of exit 44 of the beam. With the two mirrors 20, 30 arranged perpendicularly to the common plane 33, and with the light emitter lying in the common plane, the optimum position of the photocell will also be in the common plane, but means including a positioning screw 51 are provided for shifting the photocell back and forth within the plane.

As stated, when the two mirrors 20, 30 are in a reference condition of zero pressure, the light beam 43 is at a point of exit 45, which may be adjusted, by manipulation of the adjusting screws, to fall at the edge of the photocell 50. However, when a pressure P is applied between the cylinders, a minute but predetermined bowing of the cylinder 10 takes place so that the cylinder axis 15 is no longer straight but becomes bowed as indicated at 15' in FIG. 1b, causing the mirror 20 to move to a slightly angled position 20', the change in angle being in accordance with the amount of applied pressure.

With the mirror in angled position 20', the beam 43 shifts to a new multiple reflection path 43' resulting in a shift of point of exit to a new position 45', resulting in a change in the output of the photocell 50. The means for responding to the photocell, may in the simplest aspect of the invention, be in the form of a meter 52.

In carrying out the invention the photocell may be related to the light beam in a number of different ways to produce an output signal which varies in accordance with the applied pressure. Thus referring to FIG. 5, the beam 43 from the emitter, although concentrated, may have sufficient width relative to the photocell dimension as to provide varying output of the photocell in accordance with the degree of overlap (O.L.) between the beam and the field of the photocell.

Alternatively, as shown in FIG. 6, the beam 43 may be more concentrated and means may be provided for varying the photocell output in accordance with the position of the beam within the field of the cell. Using a photocell having substantially uniform response throughout its field, an optical wedge 55 may be interposed in the path of the beam and oriented in the direction of shift. As is well known, an optical wedge is simply a neutral gradation-type filter. Or, if desired, a special type of photocell may be employed having zones of progressive sensitivity, graded in the direction of the shift of the beam.

It will be further understood that the invention is not limited to use of a single photocell as a light receiving device and, instead, a stack or array of photoelectric elements may be employed, as indicated at 60 in FIG. 7, the stack being oriented in the direction of shift of the beam, with individual signals being brought out by leads 61, separately amplified by an amplifier 62, and fed to a stack or array 63 of indicating devices which may, for example, be a series of closely spaced light emitting diodes. A diode will be selectively illuminated depending upon the relative position of the light beam and, if desired, provision may be made in the electrical circuit for illuminating all of the "lesser" diodes to produce a "column of light" display.

As a still further mode of display, the outputs of the photoelectric elements in the stack 60 may be fed to a counter, capable of counting both upwardly and downwardly in accordance with the shift of the light beam and with digital display of the count.

It will be apparent that the construction is highly versatile, with the second mirror, light emitter and photocell all having adjusting screws as indicated at 32, 47, 51, respectively. It will further be apparent to one skilled in the art that the number of reflections and the point of exit of the beam under a reference condition may be easily set by manipulation of the screws. The number of reflections is determined by the adjustment of the screws 32, 47 (with the latter determining the initial angle of incidence) while the reference condition of the photocell may, as a final step, be conveniently adjusted by the screw 51 which bodily shifts the photocell 50. However, in addition to the three adjusting screws, provision is made for changing the spacing between the first and second mirrors, and thereby changing the length of the light path, without disturbing the angular orientation of the mirrors. This may, for example, be accomplished by forming the housing 35 in two relatively telescoping parts 35a, 35b as indicated in FIG. 4. For clamping the two parts in adjusted relation, the outer part may be slit and encircled by a clamping band 35c. In order to produce fine gradations of adjustment in the length of the optical path, the two portions 35a, 35b of the housing may be interengaged by a thread, with the inner portion 35a being provided with an arm or handle 35d so that, when the circular guide 38 is loosened, the inner portion may be rotated capstan-fashion to adjust the axial spacing between the mirrors while holding the outer portion of the housing stationary against rotation. Graduations may be interposed so that the adjustment is reproducible, and the adjusting screws, similarly, may be calibrated.

Under normal conditions of measurement the light emitter and photocell will be positioned to lie in the common plane 33 of the cylinders, which is the plane of maximum bending of the cylinder axis. However, use of the device is not limited thereto, and revealing force measurements may be taken at predetermined angles with respect to the common plane, even at an angle of 90°. Any angle may be selected simply by slight loosening of the screws 39 which clamp the circular guide 38, permitting the housing 35 to be rotated without disturbing the relationship of the parts which are secured within the housing.

As a further advantage of the use of a housing which is rockable about the cylinder axis, the same measuring device may be employed to measure the pressures applied by a plurality of cylinders. All that is necessary is to rotate the housing 35 successively into the shared planes of the cylinders.

It is a feature of the present construction that the output signal from the photocell is solely a function of the bowing of the cylinder, in other words solely a function of the applied force, without reference to the play which may exist in the bearings or other extraneous factors which may exist in a press, especially a press which has been in use for a long period of time.

Although the amount of the bowing deflection is slight it is, nonetheless, precisely related to the stress and greatly amplified by mechanical means, utilizing the principle of the optical lever, to produce a proportionally varying output signal at a reliably high level which is both accurate and stable. The amplification factor, although susceptible to stepped adjustment, remains precisely constant, free of the problems which are associated with electrical amplification. The device is nevertheless highly compact. Using a mirror-to-mirror distance as short as 1 inches, the total light path may, in a practical case be as long as 5 to 15 inches.

Not only does the present scheme produce reliable readings, but the readings are available on a constant monitoring basis without necessity for making a special set-up. Thus the pressman can, during the course of a run, touch up the pressure adjustments to optimize printing conditions to compensate for the effects of changes in temperature, changes in blanket characteristics, and the like. The present pressure measuring device is not limited to use in new presses and can be added to existing designs of presses including presses which have been long in the field.

While a simple form of light emitter, such as that illustrated in FIG. 3, may be economically used in carrying out the invention, an even higher degree of resolution and a greater multiplicity of reflections may be secured by using a light emitter in the form of a low power laser, particularly in association with a light receiver in the form of a stack of closely spaced photoelectric elements such as that illustrated in FIG. 7.

Reference to the mirrors 20, 30 as "substantially parallel" to one another includes the condition of precise parallelism as well as small but intentional departures therefrom in one direction or the other to achieve a desired number of reflections.

In the embodiments of the invention described above, a progressive photocell output is produced, the output varying either upwardly or downwardly, with progressive shift of the point of exit of the beam. However, it will be appreciated by one skilled in the art that the invention is not limited to production of a progressive output signal, and a reading indicative of applied pressure may be produced, without departing from the invention, by use of what may be conveniently referred to as "cancellation" or "follow-up" techniques.

By way of example of such techniques a concentrated light beam may be focused upon a photoelectric cell of small dimension to produce a maximum output under a reference condition of zero pressure. When the two cylinders are subsequently brought into pressure engagement, the bowing of the cylinder, resulting in shifting of the beam, will cause the output of the photocell to decrease. By rotating the photocell adjusting screw 51 the photocell may be brought back into alinement with the shifted beam to reestablish a maximum output signal. The adjusting screw may be calibrated so that the amount of follow-up rotation which has been found necessary to counteract, or cancel out, the shift of the beam, is a measure of the pressure which has produced the shift.

Nor is the invention limited to using the photocell adjusting screw 51 for such follow-up purposes. The mirror adjusting screw 32 and the emitter adjusting screw 47 can both be calibrated and used in an analogous fashion to reestablish an initial reading of the photocell. Consequently, the expression that the photocell is so constructed and arranged as to produce an output signal which varies in accordance with the shift in the point of exit of the beam is not limited to the situation in which there is a progressive change in output signal as a function of shift, although such is the preferred embodiment, but includes photocell arrangements in which the output signal of the photocell varies abruptly as a function of beam position and in which the output signal denoting the amount of beam shift is in terms of the follow-up movement to which one of the adjusting screws must be subjected to follow-up, or cancel out, the shift of the beam.

I claim as my invention:

1. A device for measuring the pressure between two cylinders in a printing press frame along a common plane containing the two cylinders comprising, in combination, a cylinder having a pair of journals supported in respective bearings in the press frame, a first mirror fixed to the end of one of the journals perpendicularly to and centered upon the cylinder axis for rotation with the cylinder, a relatively stationary second mirror facing the first mirror, means for mounting the second mirror on the frame spaced substantially parallel to the first mirror, a light emitter at one edge of the mirrors and lying substantially in the common plane for directing a concentrated beam of light between the mirrors at a shallow angle of incidence for multiple reflection thereof with the point of exit of the beam of shifting in accordance with changes in the angular position of the first mirror as a result of slight bowing of the cylinder in response to changes in applied pressure, means including a photocell at the region of exit for receiving the beam following the multiple reflection, the photocell means being so constructed and arranged as to produce an output signal which varies in accordance with the shift in the point of exit of the beam with the result that the output signal constitutes a measure of the applied pressure.

2. The combination as claimed in claim 1 in which the light emitter and photocell have a common mounting member, and means are provided on the press frame for securing the mounting member to the press frame while permitting rotation thereof about the cylinder axis to bring the emitter and photocell into alinement with the common plane of the cylinders.

3. The combination as claimed in claim 2 in which the means for securing the mounting member includes a circular flange to bring the emitter and photocell into alinement with the common plane of the cylinders while permitting measurements at an angle thereto, and means for clamping the flange to hold the mounting member in a desired angular position relative to the common plane.

4. The combination as claimed in claim 1 in which means are provided for adjusting the angular position of the second mirror about an axis which is perpendicular to the common plane.

5. The combination as claimed in claim 1 in which means are provided for adjusting the axial spacing between the mirrors while maintaining them in constant angular relationship.

6. The combination as claimed in claim 1 in which means are provided in association with the light emitter for varying the shallow angle of incidence of the beam.

7. The combination as claimed in claim 1 in which a hinged joint is provided between the mounting means and the light emitter, the hinged joint being oriented to permit swinging movement of the light emitter in the plane of the photocell for adjusting the angle of incidence of the beam.

8. The combination as claimed in claim 1 in which the beam, although concentrated is of sufficient width relative to the photocell dimension as to provide varying output of the photocell in accordance with the degree of overlap between the beam and the field of the photocell.

9. The combination as claimed in claim 1 in which the beam is of a width which is substantially less than the dimension of the photocell and in which means are provided in association with the photocell for varying its output in accordance with the shifted position of the beam upon the field of the photocell.

10. The combination as claimed in claim 1 in which the photocell has provision for bodily adjustment along the common plane for varying the relative position of the photocell with respect to the beam to establish a reference condition.

11. The combination as claimed in claim 1 in which the light beam is narrow with respect to the dimension of the photocell means and in which the photocell means includes a plurality of photoelectric elements which are exposed to the beam sequentially upon shifting of the beam with means for responding to the illumination element by element.

12. The combination as claimed in claim 1 in which the total length of the light beam is within a range of 5 inches to 15 inches.

13. A device for measuring the pressure between two cylinders in a printing press frame along a common plane containing the two cylinders comprising, in combination, a cylinder having a pair of journals supported in respective bearings in the press frame, a first mirror fixed to the end of one of the journals perpendicularly to and centered upon the cylinder axis for rotation with the cylinder, a housing surrounding the first mirror, a second mirror stationarily mounted within the end of the housing spaced from the first mirror and substantially parallel thereto, a light emitter at one edge of the second mirror and lying substantially in the common plane for directing a concentrated beam of light between the mirrors at a shallow angle of incidence for multiple reflection thereof and so that the point of exit of the beam at the opposite edge of the second mirror shifts in accordance with changes in the angular position of the first mirror as a result of slight bowing of the cylinder in response to changes in applied pressure, means including a photocell fixed at the region of exit for receiving the beam following the multiple reflection, the photocell means being so constructed and arranged as to produce an output signal which varies in accordance with the shift in the point of exit of the beam with the result that the output signal constitutes a measure of the applied pressure, and means for angularly adjusting the second mirror about an axis which is perpendicular to the common plane for determining the number of multiple reflections and for relatively shifting the point of exit of the beam with respect to the field of the photocell to establish a reference condition.

14. A device for measuring the pressure between two cylinders in a printing press frame along a common plane containing the two cylinders comprising, in combination, a cylinder having a pair of journals supported in respective bearings in the press frame, a first mirror fixed to the end of one of the journals perpendicularly to and centered upon the cylinder axis for rotation with the cylinder, a relatively stationary second mirror facing the first mirror, means for mounting the second mirror on the frame spaced substantially parallel to the first mirror, a light emitter at one edge of the mirrors and lying substantially in the common plane for directing a concentrated beam of light between the mirrors at a shallow angle of incidence for multiple reflection thereof with the point of exit of the beam shifting in accordance with changes in the angular position of the first mirror as a result of slight bowing of the cylinder in response to changes in applied pressure, means including a photocell at the region of exit for receiving the beam following the multiple reflection, at least the emitter, second mirror or photocell means being adjustable in a direction to relatively shift the point of exit of the beam.

* * * * *